Jan. 28, 1930.   T. B. CAMERON   1,744,749
COUNTERSKIVING MACHINE
Filed Oct. 11, 1926   3 Sheets-Sheet 1

Inventor
T. B. Cameron,
By Clarence A. O'Brien
Attorney

Jan. 28, 1930.　　　T. B. CAMERON　　　1,744,749
COUNTERSKIVING MACHINE
Filed Oct. 11, 1926　　3 Sheets-Sheet 2
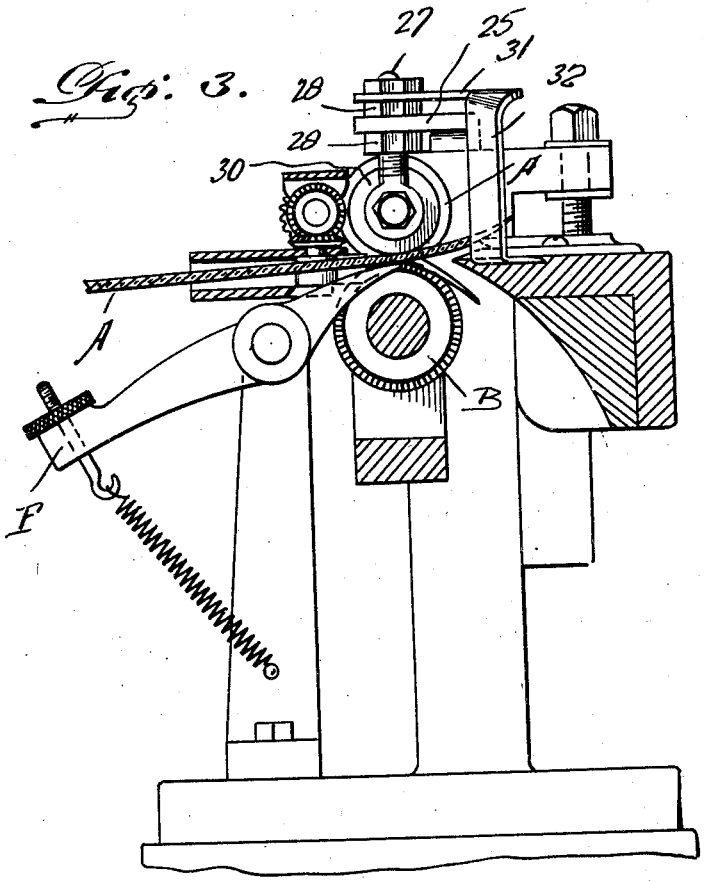
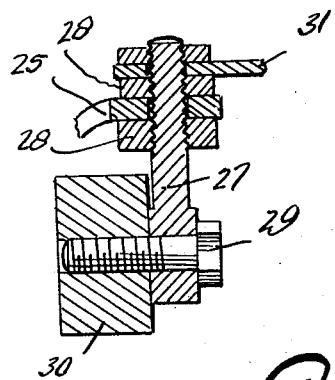
Inventor
T. B. Cameron,
By Clarence A. O'Brien
Attorney Jan. 28, 1930.  T. B. CAMERON  1,744,749
COUNTERSKIVING MACHINE
Filed Oct. 11, 1926  3 Sheets-Sheet 3
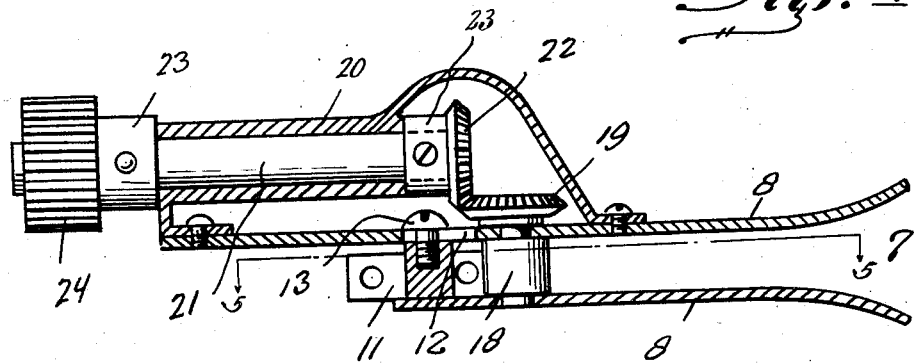
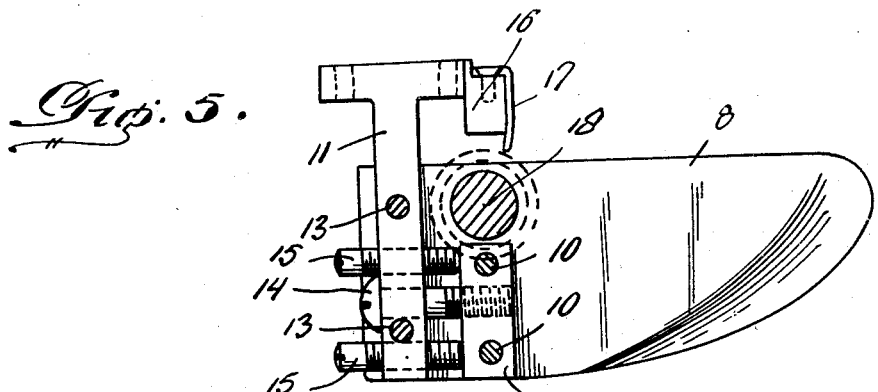
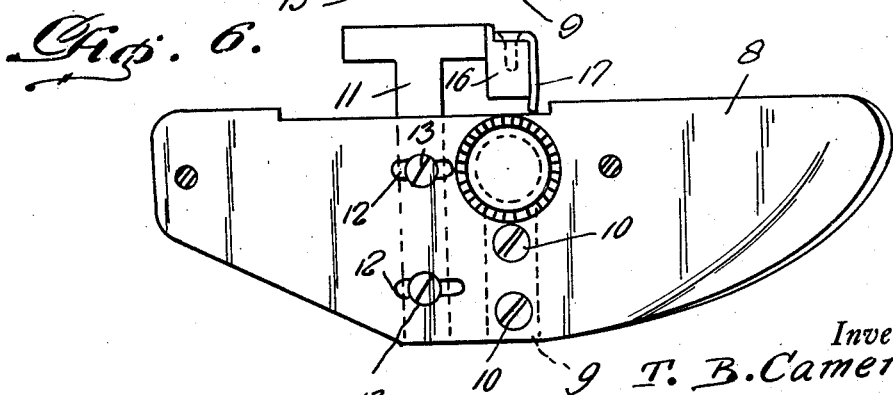
Inventor
T. B. Cameron,
By Clarence A. O'Brien
Attorney Patented Jan. 28, 1930

1,744,749

UNITED STATES PATENT OFFICE

THOMAS BYRAN CAMERON, OF HOP BOTTOM, PENNSYLVANIA

COUNTERSKIVING MACHINE

Application filed October 11, 1926. Serial No. 140,988.

This invention relates to new and useful improvements in machines for skiving shoe heel counters and has for its primary object to provide improved means whereby the counter is positively turned and fed to the feeding rollers for the curved-edge skiving knife.

In carrying out the present invention it is my intention to provide a counter guide unit for the Stewart type tandem-counter skiving machine shown and described in Patent No. 653,892, granted to W. C. Stewart, on the 17th day of July, 1900.

In the operation of the machine protected by U. S. Letters Patent above identified it occasionally occurs that the counter after passing through the innermost pressure and under feed rolls of the straight-edge skiving unit of the machine will so enter the counter guide as to cause the counter to become stuck therein with the result that the same will not move in endwise manner between the feed rolls for the curved-edge skiving knife. Whenever a counter blank becomes jammed within said guide it is necessary for the operator of the machine to grasp the counter and properly arrange the edge of the same between the feed rolls for the curved edge skiving knife, while frequently it becomes necessary to stop the operation of the entire machine in order that the improperly fed counter blank may be entirely removed from the guide.

One of the primary objects of the present invention is to provide a guide unit that may be applied to the skiving machine in lieu of the regular guide with which the particular type of machine is equipped, and this without requiring any extensive alteration of the machine (if any at all), it merely being necessary to remove the conventional guide and apply my device in substitution therefor.

The particular guide unit is so constructed as to permit the same to be moved toward or away from the innermost superposed presser and under feed rolls of the straight-edge skiving unit of the machine in order to accommodate counter blanks of various lengths.

As an added improvement to the type of counter-skiving machine shown and described in the patent above identified, I provide means whereby the pressure of the counter friction producing device, known in the art as a spring pressed finger, may be entirely removed from the upper feed roll actuating shaft of the curved-edge skiving unit of this type of machine. It is well known in the trade that said friction producing device or finger will cause an upward thrust upon said upper feed roll operating shaft resulting in the heating of the shaft bearing, thus necessitating the slow operation of the machine and the constant lubrication of said shaft as well as the attention of the operator to see that said shaft does not become heated to a too great extent.

Other objects will become apparent as the nature of the invention is better understood, the same comprising the novel form, combination, and arrangement of parts hereinafter more fully described, shown in the accompanying drawings and claimed.

In the drawings wherein like reference characters indicate corresponding parts throughout the several views:

Figure 3 is a transverse section through the machine, improved in accordance with the present invention and taken approximately upon the section line 3—3 of Figure 2.

Figure 4 is a detail enlarged longitudinal section through my guide unit per se on the line 4—4 of Figure 2.

Figure 5 is a longitudinal section taken directly beneath the upper plate member of the guide unit on the line 5—5 of Figure 4.

Figure 6 is a top plan view thereof, certain removable elements being disconnected therefrom, and Figure 7 is a vertical sectional view through the unit that is provided for receiving the pressure of the friction producing finger of the machine so as to relieve said pressure from the upper feed roll operating shaft.

Figure 1:
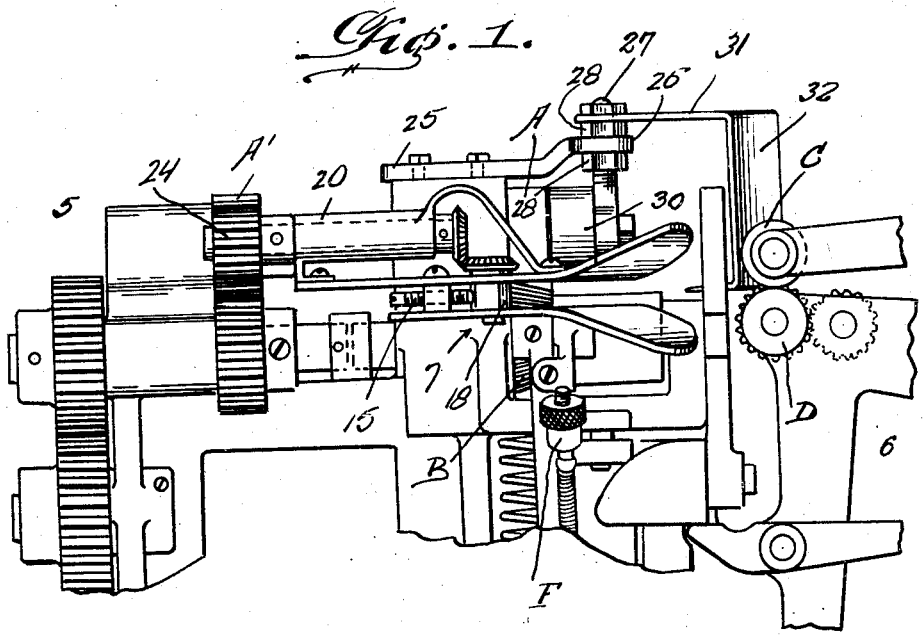
Figure 1 is a fragmentary inner side elevation of the Stewart type tandem-counter skiving machine improved in accordance with the present invention.

Now having particular reference to the drawings, 5 designates generally the curved-edge skiving unit of a Stewart tandem-counter skiving machine, while 6 designates generally the straight-edge skiving unit of such machine. The general construction and operation of this type of machine is well known in the trade and is fully shown and described in the U. S. Letters Patent heretofore referred to, and accordingly it is not believed necessary to give a detailed description of the parts of the machine shown in the drawing.

In carrying out my invention I remove from the curved-edge skiving unit, the usual counter guide arranged directly in front of the skiving knife feed rolls A and B and in lieu thereof I secure to the machine in a manner similar to the manner of attachment of the conventional guide my improved form of guide designated generally by the reference character 7. This guide consists of a pair of superposed metallic plates 8—8, the outer ends of which are curved and outwardly flared as clearly disclosed in Figures 4, 5, and 6, this being true also of the plates of the guide now in use upon the machine and accordingly forming no important part of the invention. The inner end of the uppermost plate 8 extends considerably beyond the innermost end of the lower plate while said plates are secured in spaced relation inwardly of the end of the lowermost plate and at the outer edges of the plates by a transverse block 9, the inner end of which terminates short of the inner edges of said plates 8—8 as clearly indicated in Figure 5, said block being secured between said plates by two or more screws 10—10.

Outwardly of said block 9 there is slidably arranged between the plates a transversely extending T-shaped block 11, the inner crossed end of which is provided adjacent its opposite ends with threaded openings so as to permit the same to be securely attached to the machine between the innermost bearings of the upper and lower feed roll operating shafts in a manner similar to the manner of attachment of the guide now in use. The uppermost plate 8 of the guide 7 is provided adjacent its inner and outer edges with longitudinally extending slots 12—12 in registration with threaded sockets in the top surface of the block 11 between said plates in order that screws 13—13 may be threaded into said sockets for securing the plates 8 and the block 11 with respect to each other, the slots 12—12 permitting relative adjusting movement of the plates 8 and the block 11.

The previously mentioned spacing block 9 is formed between the attaching screws 10—10 with a transverse threaded opening for receiving the inner threaded end of a headed screw 14, the shank portion of which directly inwardly of the head is unthreaded as indicated in Figure 5, this portion of said screw shank being slidably disposed through an opening in the block 11 in registration with the threaded opening in the spacing block 9. Threaded through threaded openings in this block 11 at opposite sides of the headed screw 14 are set screws 15—15 the inner ends of which bear against the block 9 so as to permit of an adjustment of the guide plates with respect to the attaching block, this provision being made in order that the guide may be moved toward or away from the superposed inner end presser roll and inner end under feed roll of the straight edge skiving unit designated C and D respectively, see Figure 1. Obviously, after the desired adjustment has been made, the screws 13—13 are tightened to prevent accidental movement of the guide with respect to its attaching block.

Upon the inner end of the cross portion of the attaching block 11 for said guide 7 is a lug 16 on the outer side edge of which is applied an anti-friction plate 17, normally in transverse alignment with the outer edge of the spacing block 9 so as to properly guide the end of the counter between the feed rolls A and B as the counter is being turned around within the guide which is the manner of movement of the counter during the curved-edge skiving operation.

Mounted between the plates 8—8 of the spacing guide 7 directly inwardly of the spacing block 9 is a counter feed roller 18, the opposite ends of which are equipped with pintles journaled within registering openings in said guide plates, see Figure 4. The upper pintle of said feed rollers 18 projects through the uppermost plate and is equipped with a beveled gear 19. Arranged upon the top surface of the uppermost guide plate 8 is a horizontal bearing unit 20 within which is journaled a shaft 21, the inner end thereof being equipped with a beveled gear 22 that has mesh with the bevel gear 19 of the feed roller 18. Longitudinal thrust preventing collars 23—23 are disposed upon the shaft 21 at the opposite ends of the bearing of said unit 20 while upon the extreme outer end of this shaft 21 is a spur gear 24 that meshes with the usual gear A′ of the operating shaft A″ for the upper feed roll A so that said shaft 21 is rotated during the operation of the machine for consequently imparting rotation to the counter force feed roller 18 within the plates of the guide unit 7.

Figure 2:
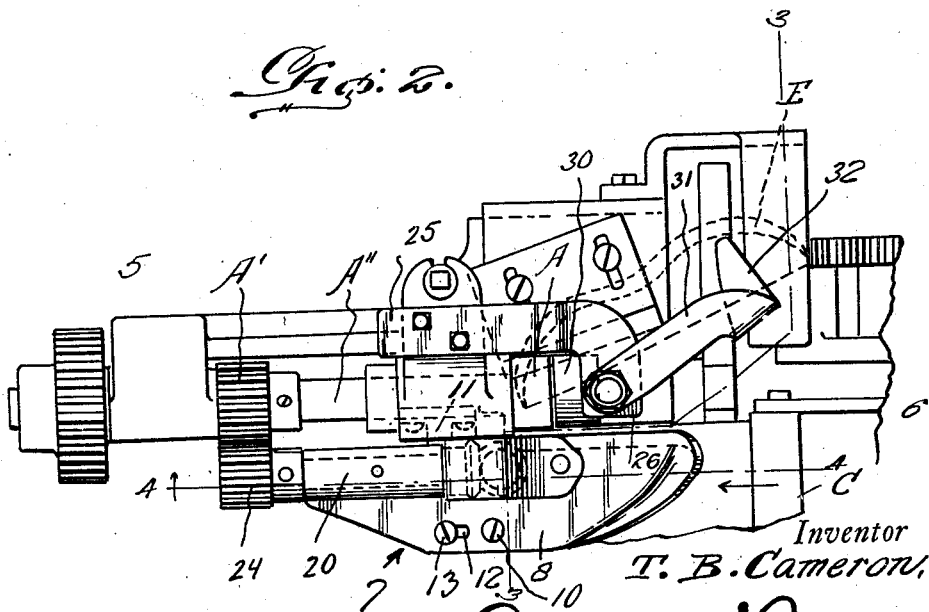
Figure 2 is a fragmentary top plan view thereof for disclosing my guide unit and friction relieving unit for the uppermost feed roll operating shaft of the curved-edge skiving unit of the machine.

It will thus be seen that as the counter, disclosed in dotted lines and indicating by the reference character E in Figure 2, moves between the plates of the guides in lengthwise manner, the same will as usual strike the connecting member at the inner ends of the guide plates which in the present instance is the spacing block 9. In the operation of this type of machine, the counter then begins to turn inwardly so that the inner end will be grasped by the rollers A and B. As previously stated it frequently happens that the counter will not be fed to these rollers for a large number of reasons. Obviously by the presence of the roller 18 between the plates of the guide said counter will be engaged by the roller and forcibly moved into position between the curved-edge skiving knife feed rolls A and B.

As hereinbefore stated, the invention further aims to provide means whereby the pressure of the friction producing finger is relieved from the upper feed roller operating shaft of the curved-edge skiving unit of this type of skiving machine. In order to accomplish this result the end of said shaft, which is designated in the drawings as A″ beyond the feed roll A, is removed as well as the usual stationary roll that is carried by the end of the machine outwardly of said feed roll A, this unit being designated in the Stewart patent by the reference character 36. After this operation has been performed, I secure in back of the inner bearing for said shaft A″ a plate-like arm 25 that extends horizontally inwardly in back of the feed roll A as clearly indicated in the top plan view, Figure 2. The inner end of this arm 25 is offset slightly upwardly and thence extended inwardly as at 26 and arranged through an opening in the inwardly extending end is the threaded end of a depending eye-bolt 27, which bolt is secured to the arm at opposite sides thereof by nuts 28—28, see Figures 1 and 3. Arranged through the eye of this bolt is a headed machine screw 29 that projects toward the feed roll A and upon which is rigidly mounted a stationary roll 30 disposed in true alignment with said feed roll A and against which is pressed the counter E by reason of a friction producing device or finger F. Obviously, by reason of this provision no pressure is applied to the feed roll carrying shaft A″, thus permitting the machine to be operated at high speed without any danger of said shaft becoming overheated which is a great disadvantage in the type of machine upon which my invention is an improvement.

Associated with the upper threaded end of the eye-bolt 29 in such a manner as to permit the swinging of the same upon said bolt is a diagonally outwardly extending arm 31 formed so as to provide at its end a depending L-shaped finger 32 that terminates adjacent the inner end presser roll C as well as the under feed roll D of the straight edge skiving unit so as to prevent the counter E passing between said rolls.

It will thus be seen that I have substantially improved and to some extent simplified the operation and construction of the particularly mentioned counter skiving machine and even though I have herein shown and described my invention as consisting of certain detail structural elements it is nevertheless to be understood that some changes may be made therein without affecting the spirit and scope of the appended claims.

Having thus described the invention, what I claim as new and desire to secure by Letters Patent is:—

1. In a counter-skiving machine, a frame, mechanism for skiving the straight edge of the counter, mechanism for skiving the curved edge of the counter, a guide unit for the latter mechanism, means for so attaching said guide unit to the frame that the unit can be longitudinally adjusted with respect to said means, and means within the guide unit for feeding the counter therethrough.

2. A counter-skiving machine comprising a frame, a skiving knife, upper and lower feed rollers to feed a counter to said knife, a spring pressed finger to retard the feeding of the counter, an arm attached to said frame, and a roller carried by said arm and positioned adjacent to and in alinement with said upper feed roller.

In testimony whereof I affix my signature.

THOMAS BYRAN CAMERON.